(12) United States Patent
Ackermann

(10) Patent No.: US 11,416,264 B2
(45) Date of Patent: Aug. 16, 2022

(54) SOFTWARE COMPONENT CONFIGURATION ALIGNMENT

(71) Applicant: SAP SE, Walldorf (DE)

(72) Inventor: Erich Ackermann, Ladenburg (DE)

(73) Assignee: SAP SE, Walldorf (DE)

( * ) Notice: Subject to any disclaimer, the term of this patent is extended or adjusted under 35 U.S.C. 154(b) by 423 days.

(21) Appl. No.: 16/552,262

(22) Filed: Aug. 27, 2019

(65) Prior Publication Data
US 2021/0064389 A1 Mar. 4, 2021

(51) Int. Cl.
*G06F 9/445* (2018.01)
*G06F 9/30* (2018.01)

(52) U.S. Cl.
CPC ...... *G06F 9/44505* (2013.01); *G06F 9/30003* (2013.01); *G06F 9/30145* (2013.01)

(58) Field of Classification Search
CPC ............. G06F 9/44505; G06F 9/30003; G06F 9/30145
See application file for complete search history.

(56) References Cited

U.S. PATENT DOCUMENTS

| | | | |
|---|---|---|---|
| 7,385,938 B1 * | 6/2008 | Beckett | H04L 41/0813 370/254 |
| 7,865,707 B2 * | 1/2011 | Bittlingmayer | G06F 9/44505 713/1 |
| 9,614,873 B1 * | 4/2017 | Theimer | H04L 63/20 |
| 2003/0159028 A1 * | 8/2003 | Mackin | G06F 8/00 713/100 |
| 2009/0113414 A1 * | 4/2009 | Hamilton | G06F 9/44505 717/173 |
| 2012/0102160 A1 * | 4/2012 | Breh | G06F 9/5061 709/220 |
| 2014/0280306 A1 * | 9/2014 | Juillard | H04L 67/34 707/769 |
| 2015/0095630 A1 * | 4/2015 | Cote | G06F 9/4401 713/1 |
| 2016/0004551 A1 * | 1/2016 | Terayama | G06F 9/45558 718/1 |
| 2016/0269482 A1 * | 9/2016 | Jamjoom | H04L 45/64 |
| 2017/0235612 A1 * | 8/2017 | Chen | G06F 9/5088 718/1 |
| 2018/0367434 A1 * | 12/2018 | Kushmerick | H04L 43/14 |
| 2019/0334768 A1 * | 10/2019 | Parthasarathy | H04L 41/0806 |
| 2020/0328941 A1 * | 10/2020 | Feiguine | H04L 41/0816 |

* cited by examiner

*Primary Examiner* — Glenn A. Auve
(74) *Attorney, Agent, or Firm* — Mintz Levin Cohn Ferris Glovsky and Popeo, P.C.

(57) ABSTRACT

A method, a system and a computer program product for performing software configuration alignment. An indication of a source configuration change of one or more source computing processes of a source computing system is received from the source computing system. A determination is made whether the source configuration change is applicable to one or more target computing processes of a target computing system. The target computing system is communicatively coupled to the source computing system. Using the source configuration change, a target configuration change for implementation in the target computing processes of the target computing system is generated. The generated target configuration change is transmitted to the target computing system. The generated target configuration change is implemented in the target computing processes of the target computing system.

17 Claims, 8 Drawing Sheets

SOFTWARE COMPONENT CONFIGURATION ALIGNMENT

TECHNICAL FIELD

This disclosure relates generally to data processing and, in particular, to alignment of configurations of software components to ensure interoperability of various computing systems and processes.

BACKGROUND

In today's world, business rely on a multitude of computing processes for performing various tasks. Each such computing process may need to be configured in order to execute desired functionalities, transactions, tasks, etc. The computing processes may be executed by various computing systems that may be disposed across a vast operational landscape. For example, one computing process may executed by two different entities (e.g., businesses) that require that such computing process is similarly (or in the same way) configured everywhere. Such configuration may ensure uninterrupted operation of computing systems used by the entities. However, it is not always possible to quickly, efficiently, and effectively determine whether configuration changes to the same process by one entity should be and/or are applicable to the same process executed by another entity. As such, there is a need for a way to effectively determine and apply configuration changes across computing systems.

SUMMARY

In some implementations, the current subject matter relates to a computer implemented method for performing software component configuration alignment. The method may include receiving, from a source computing system, an indication of a source configuration change of one or more source computing processes of the source computing system, and determining whether the source configuration change is applicable to one or more target computing processes of a target computing system. The target computing system may be communicatively coupled to the source computing system. The method may further include generating, using the source configuration change, a target configuration change for implementation in the target computing processes of the target computing system, and transmitting the generated target configuration change to the target computing system. The generated target configuration change is implemented in the target computing processes of the target computing system.

In some implementations, the current subject matter can include one or more of the following optional features. In some implementations, the target computing processes may correspond to the source computing processes. Further, the target computing processes may be dependent on the source computing processes.

In some implementations, the determination of the target configuration change may include determining that the source configuration change is not applicable to the one or more target computing processes. In this case, the target configuration change is not generated upon determination that the source configuration change is not applicable to the target computing processes.

In some implementations, source configuration change may include at least one of the following: a new configuration, a mapping of configurations in the source computing system, and an update to an existing configuration.

In some implementations, the target configuration change may be generated based on at least one of the following: the source configuration change, one or more parameters corresponding to the source configuration change, a mapping data of the target computing system, one or more configurations of the one or more target computing processes, and one or more configuration rules.

In some implementations, the configuration rules may include at least one of the following: one or more basic rules identifying correspondence between one or more parameters of source and target computing processes, one or more simple rules identifying correspondence between one or more parameters of source and target computing processes using one or more prefixes, one or more complex rules identifying a plurality of parameters of the source computing processes for determination of one or more parameters of the target computing processes, and one or more coded rules for determination of coding for one or more parameters of the target computing processes.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
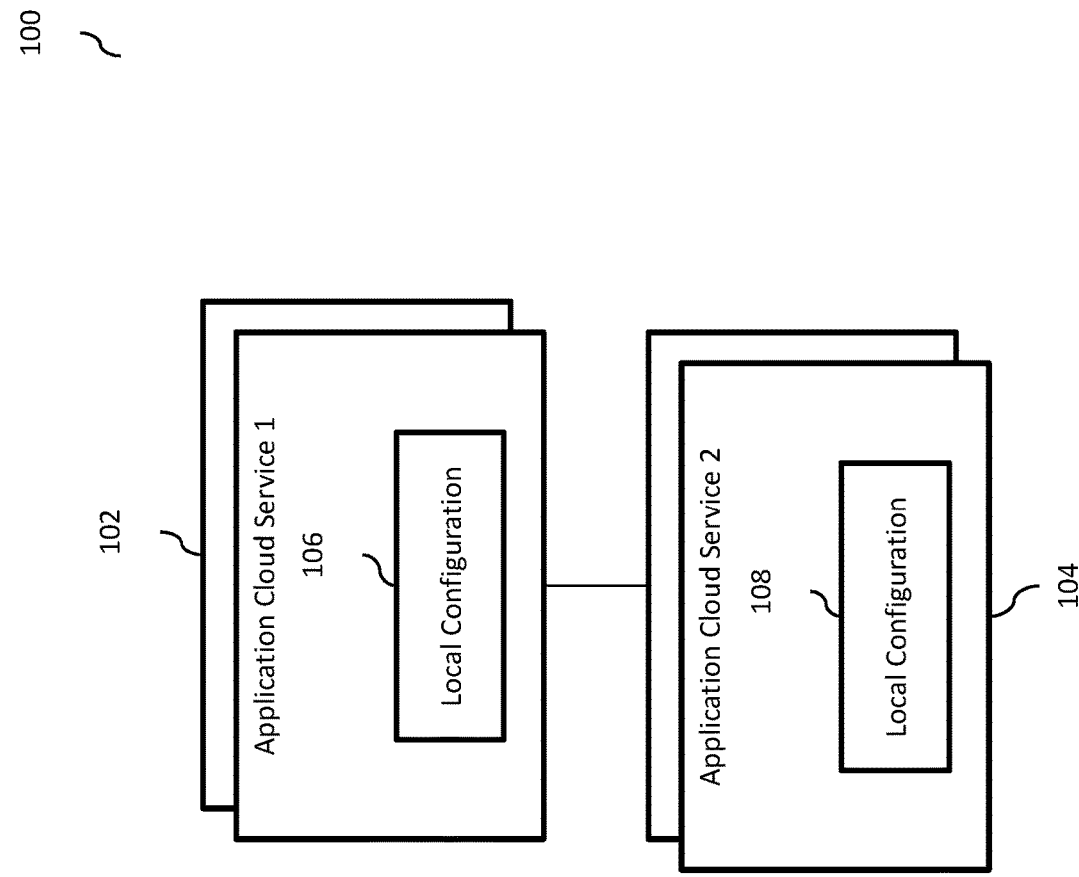
FIG. 1 illustrates an exemplary system that includes a plurality of computing systems having local configurations.

To address these and potentially other deficiencies of currently available solutions, one or more implementations of the current subject matter relate to methods, systems, articles of manufacture, and the like that can, among other possible advantages, provide an ability to align configurations of software components to ensure interoperability of various computing systems and/or processes.

Computing systems provide support to businesses worldwide in automating processing of various transactions (e.g., software functions, business transactions, financial transactions, etc.), day-to-day operations, as well as other activities. Such computing systems typically include one or more local computing systems that provide access to users for performing various computing functions, transactions, etc. Each local computing system may have local processing and storage capabilities. The computing systems may be communicatively coupled via one or more networks (e.g., WAN, LAN, MAN, etc.) and may provide interoperability among various computing functions.

Each local computing system may be configured in accordance with various requirements and/or standards. Additionally, users may also configure local computing systems in accordance with their preferences and/or requirements, e.g., users may adapt in one computing system (e.g., a tenant) a behavior of a process of another corresponding computing system. Configuration parameters of computing systems may be stored locally and/or globally.

However, computing systems typically employ computing products that may be required to provide uninhibited interaction between computing systems and other computing products (e.g., IES Lead2Cash scenario includes of more than 10 different computing products and corresponding business configurations that may need to be configured to ensure interoperability among the products and computing systems running processes associated with these products).

In particular, one computing system may include one or more local configurations that may need to be "aligned" with configurations of other computing systems (e.g., provide uninterrupted interoperability among systems). This means that the local configuration may need to be changed accordingly, thereby having a local impact on the corresponding computing system. The computing system configuration requirement alignment with other systems' configurations may require follow up actions after one or more configuration parameters are changed on other computing systems. This may ensure that computing systems continue operating without interruption.

In some cases, computing system configurations may include dependent configurations and/or other computing systems whose configurations may depend on configurations of other systems. Hence, changes in one system may affect how dependent computing systems operate. Such dependencies may make it difficult to ensure continuous interoperability of computing systems especially when configurations of computing components change. For example, if a dependent configuration is not updated correctly and/or timely, the computing systems and/or processes associated with that dependent configuration and/or being dependent on such configuration may fail to execute properly (e.g., fail to or create business documents with inconsistent data). This may cause interruptions of system operations, execution of transactions, etc. (e.g., in financial transactions, wrong postings may occur, leading to incorrect balance sheets, year-end closings).

Further, updating configurations may be further complicated by the dependency relationships among computing systems. If the relationship is known, the workflow of triggering the follow-up configuration change may typically be manual, which means it could be error prone (e.g., actions may be forgotten), costly, because it relies on manual interaction between various involved entities, and it might not be fulfilling customer's expectations of an integrated suite of computing components/processes.

FIG. 1 illustrates an exemplary system 100 that includes a plurality of computing systems having local configurations. In the system 100, a computing process (e.g., a business process) may be provided via an orchestration of multiple tenants, where the computing process configuration is managed locally without any alignment across the tenants. As shown in FIG. 1, the system 100 may include one or more application cloud services or tenants 1 102 communicatively coupled via a network 110 to one or more application cloud services or tenants 2 104. The tenants 102, 104 may be configured to be part of a larger network of tenants that may interact with one another to perform one or more computing transactions, functions, processes, etc.

The tenants 102 may include a local configuration 106 and the tenants 104 may include a local configuration 108. The local configurations 106, 108 may be locally managed by each respective tenant 102, 104. In some instances, when local configuration in one tenant (e.g., tenant 102) change, it might not necessarily cause a change in the local configuration in another tenant (e.g., tenant 104). This may cause a breakdown in the processes that may be performed by both tenants 102, 104, where the processes may require participation of both tenants and/or may use data, processes, etc. generated by one or both tenants.

Thus, it is important that local configurations of computing systems or tenants are timely updated or aligned to ensure interoperability and/or uninterrupted operations of the entire system of tenants as well as each individual tenant. The current subject matter is configured to provide such capabilities that may ensure computing system/process configuration consistency across multiple tenants, ensure that any follow up actions in tenants are not missed, increase processing speed to a maximum, reduce any manual operations in connection with updates to a minimum, as well as provide any other advantages.

Figure 2:
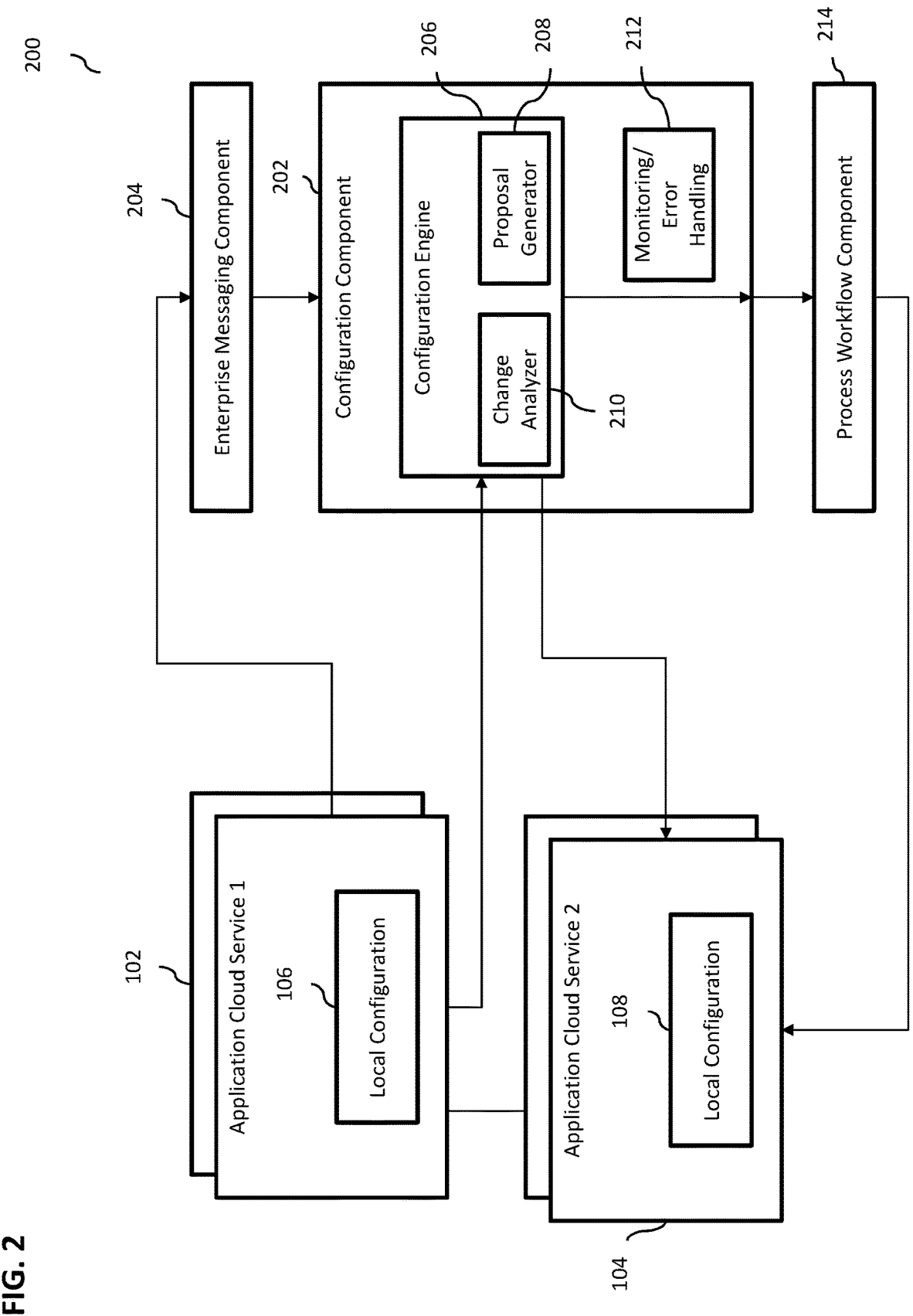
FIG. 2 illustrates an exemplary system for alignment of computing systems/processes configurations across multiple systems and/or tenants, according to some implementations of the current subject matter.

FIG. 2 illustrates an exemplary system 200 for alignment of computing systems/processes configurations across multiple systems and/or tenants, according to some implementations of the current subject matter. The system 200 may include the application cloud service or tenant 1 102 having the local configuration 106, the application cloud service or tenant 2 104 having the local configuration 108, a configuration component 202, an enterprise messaging component 204, and a process workflow component 214. Each of the components 102, 104, 202, 204, 214 may be configured to be communicatively coupled using one or more wireless and/or wired networks. Such networks may include, but are not limited to, metropolitan area networks (MAN), wide area networks (WAN), local area networks (LAN), virtual local area networks (VLAN), intranet, Internet, extranet, and/or any other networks.

The tenants 102, 104 may be configured to perform various computing processes, execute functions, perform transactions, etc. To ensure uninterrupted operations and/or interoperability of the tenants 102, 104, the respective local configurations 106, 108 of each of the tenants 102, 104 may be aligned or updated using the configuration component 202.

The configuration component 202 may include a configuration engine 206 having a change analyzer component 208 and proposal generator component 210. The configuration component 202 may also include a monitoring and error handling component 212. The configuration component 202 may be configured to be integrated into the existing tenant landscape (i.e., tenants 102, 104) to ensure that a configuration change in one tenant (e.g., tenant 102 or a "source tenant") is correctly reflected in another or dependent tenant (e.g., tenant 104 or "target tenant").

Figure 4:
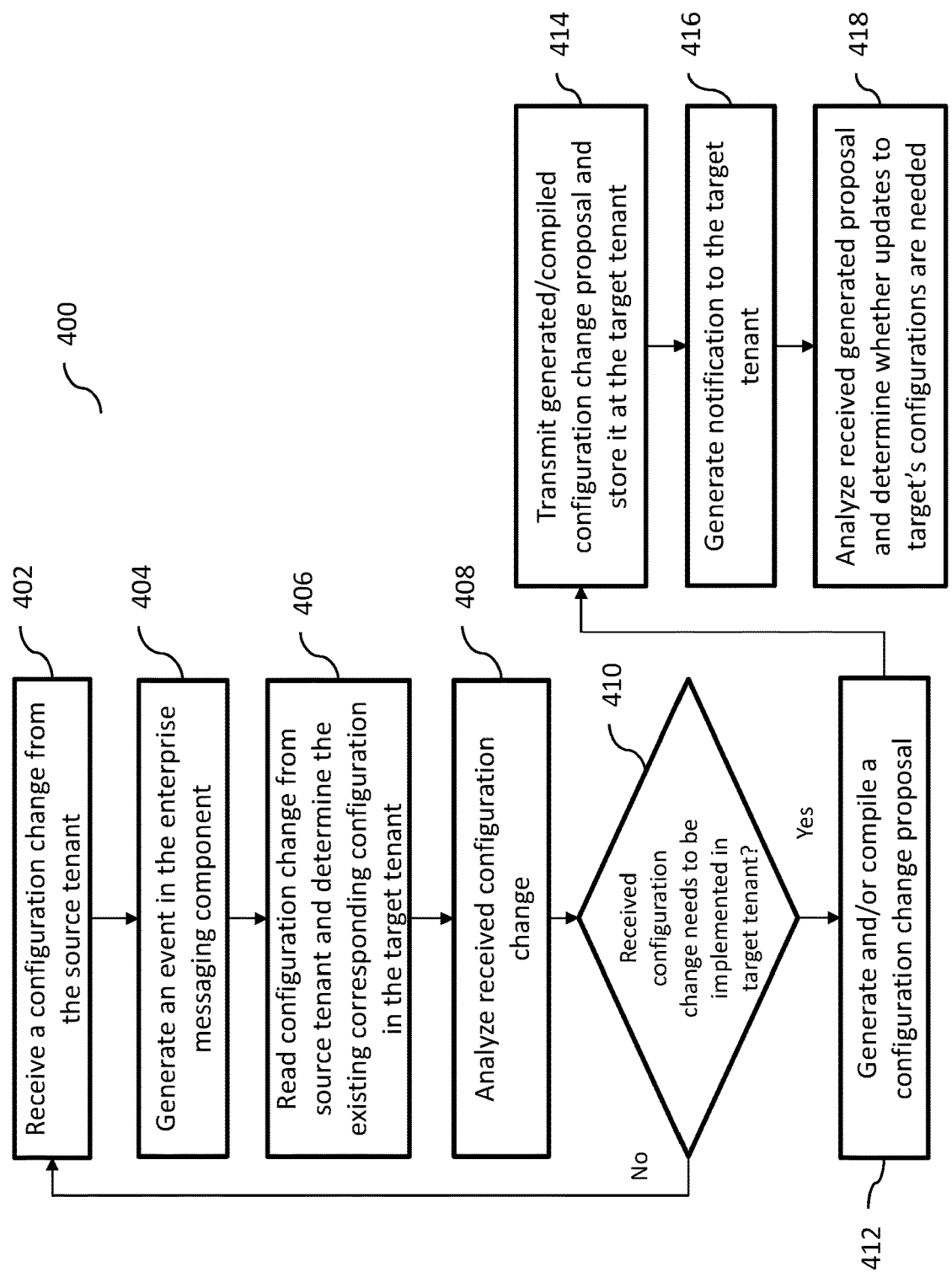
FIG. 4 illustrates an exemplary process for aligning configurations of the tenants that may be performed by one or more components of the system, according to some implementations of the current subject matter.

FIG. 4 illustrates an exemplary process 400 for aligning configurations of the tenants 102, 104 that may be performed by one or more components of the system 200, according to some implementations of the current subject matter. At 402, a configuration change may be received by the source tenant 102 (and/or released for implementation across all tenants and not necessarily in the source tenant 102). At 404, an event is generated in the enterprise messaging component 204. The enterprise messaging component 204 may be configured to be subscribed to receive notification of any configuration changes from tenant 102 and/or tenant 104 and/or from any other source of configuration changes. The tenant 102 (and/or tenant 104) may be configured to transmit a notification to the enterprise messaging component 204, which may trigger generation of such event. The notification may be transmitted in any desired format and may include an identification and/or scope of the configuration change as well as any other data and/or metadata relating to the configuration change. The configuration change may include a new configuration, an update to an existing configuration, a deletion of an existing configuration, and/or any other configuration.

At 406, the configuration component 202 may be configured to receive the generated event information from the enterprise messaging component 204 and read the configuration change that is received from tenant 102 as well as determine the existing corresponding configuration in the tenant 104. At 408, the configuration component 202 may be configured to analyze the received configuration change and determine whether received configuration change needs to be implemented in the tenant 104, at 410. Analysis of the configuration change may be performed by the change analyzer component 210 of the configuration component 202.

If the configuration change needs to be implemented in the target tenant 104, then the configuration component 202 may be configured to generate and/or compile a configuration change proposal to effect the received configuration change in the target tenant 104, at 412. The proposal generator component 208 of the configuration component 202 may be configured to generate and/or compile an appropriate configuration change proposal for implementation in the target tenant 104. At 414, the generated/compiled configuration change proposal may then be transmitted by the configuration component 202 to and stored at the target tenant 104. Otherwise, the process 400 may either end or return to monitoring of notifications for receipt of any new configuration changes from the source tenant 102.

At 416, the process workflow component 214 may be configured to generate one or more notifications to the target tenant 104 (and/or any of its users (e.g., users responsible in the target tenant 104 for a certain configuration area)) to update one or more configurations that may be associated with the received configuration change in the target tenant 104. At 418, the target tenant 104 may perform an analysis of the received generated proposal concerning the configuration changes and determine whether updates to its current configurations are needed in view of the received generated proposal.

Figure 3:
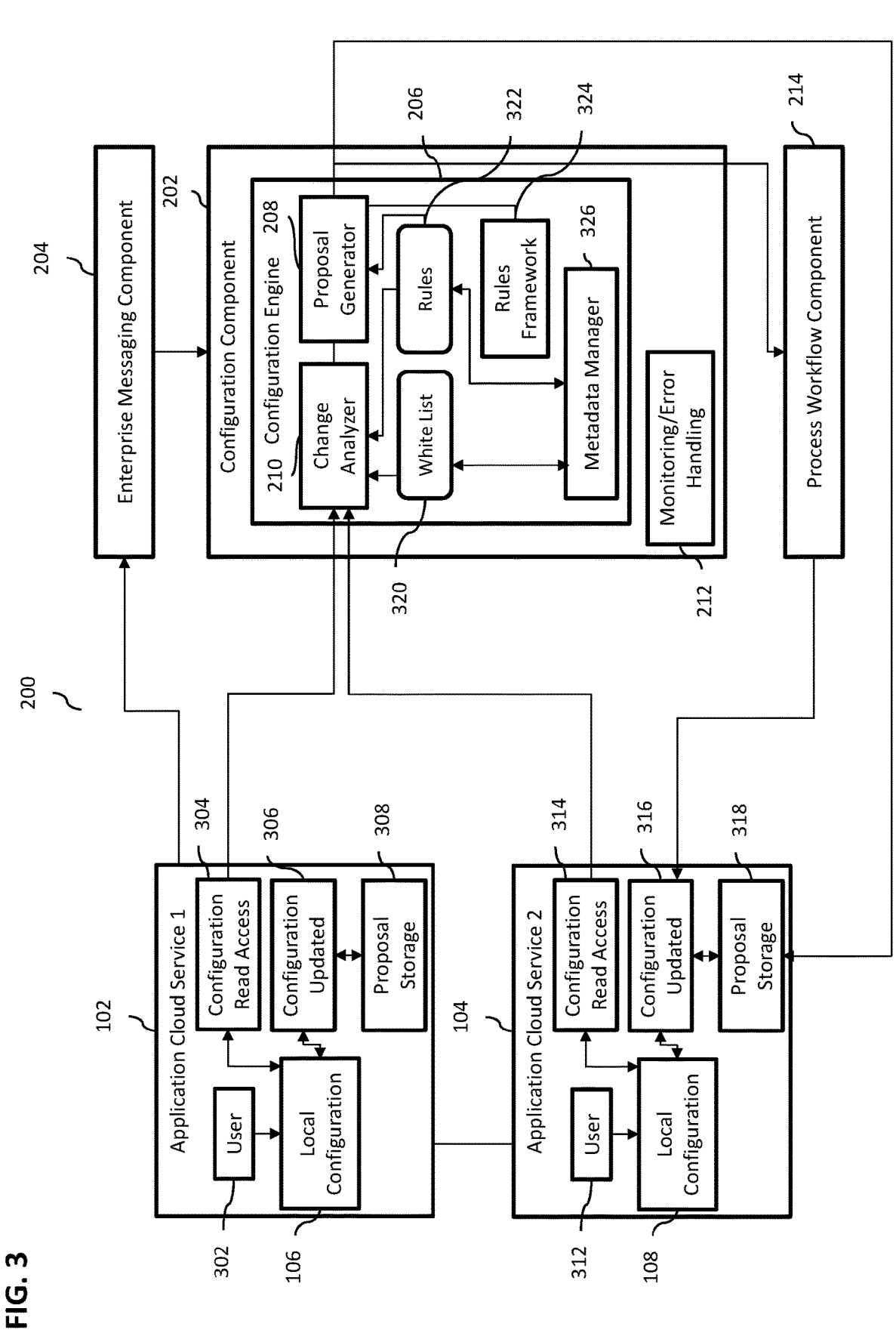
FIG. 3 illustrates additional details of the system shown in FIG. 2, according to some implementations of the current subject matter.

FIG. 3 illustrates additional details of the system 200 shown in FIG. 2, according to some implementations of the current subject matter. In particular, as shown in FIG. 3, the source tenant 102 may include one or more users 302, the local configuration 106, a configuration read access component 304, a configuration updated component 306, and a proposal storage component 308. Similarly, the target tenant 104 may include one or more users 312, the local configuration 108, a configuration read access component 314, a configuration updated component 316, and a proposal storage component 318.

The configuration component 202 may include the configuration engine 206 that along with the change analyzer 210 and the proposal generator 208 components may also include a white list component 320, a rules component 322, a rules framework component 324, and a metadata manager 326. The components of the system 200 may be communicatively coupled using one or more wireless and/or wired networks. Such components may further include hardware, software, and/or any combination thereof. Further, the components may include one or more personal computers, one or more cellular telephones, one or more smartphones, one or more laptop computers, one or more tablet computers, one or more servers, one or more storage/memory components, one or more cloud components/servers, and/or any other computing components.

In some implementations, referring to FIG. 3, the change analyzer 210 may be configured to analyze a particular change of configuration in any tenant of the system 200 and/or identify whether there is a need to update one or more configurations, including dependent configurations in any tenant that may be part of the system 200. The change analyzer 210 may be configured to store information/data about dependencies between the source and target tenants 102, 104 (and/or any other tenants) customizing objects/configurations. Such information/data may include a white list 320, which may provide an identification on customizing object level. It may also access transformation rules 322 between source and target objects, as well as any additional checks (e.g., which may be supplied by the system 200 and/or a particular user of the system 200).

The change analyzer 210 may be configured to obtain information concerning configuration changes in the source tenant as well as current configurations in the target tenant from a configuration read access component 304 of the source tenant 102 and a configuration read access component 314 of the target tenant 104. The configuration changes in the source tenant may be supplied using the local configuration component 106. The update configuration component 306 of the source tenant may be configured to process any changes to configurations and stored them in the proposal storage component 308.

Based on the information from the source tenant, the change analyzer 210 may be configured to obtain a list of changes in the source tenant 102 and, initially, identify whether there is a relevant change exists. If there are no relevant changes, the configuration component may store that information but take no further action. However, if change analyzer 210 identifies changes to relevant objects in the source tenant, the change analyzer may perform a detailed analysis of the received changes. In particular, the change analyzer 210 may read the source tenant's configuration and any change logs. It may also read the target tenant's configuration (and mapping, if it exists) and then perform a comparison of both configurations (source tenant's 102 and target tenants' 104). The change analyzer 210 may use parameters associated with configurations in view of any rules that may be obtained from the rules database 322. In some implementations, the change analyzer 210 may determine that a change from the source tenant is not relevant for the target tenant (e.g., because a source tenant's parameter was changed but needs not be transferred to the target tenant).

As a result of the analysis process performed by the change analyzer 210, a list of changes from the source tenant may be reduced to those changes that may be relevant for any target tenant. The change analyzer 210 than transmits the reduced list of changes to the proposal generator 208, which generates one or more detailed proposals how configuration in the target tenant(s) should be adapted.

The proposal generator component 208 may be configured to generate a specific proposal for implementation of any changes in the target tenant system 102 and may be support a configuration expert user in the target tenant system in updating its configuration in a consistent way, such as by taking configuration changes in the source system into account.

The proposal generator component 208 may be configured to check if there is a need to change target tenant's configuration at all. If the target tenant's configuration does not need to be adjusted, no proposal may be generated and no further action may be required. However, if a need for a configuration change/adjustment in the target tenant is identified, the proposal generator 208 may be configured to identify a way how the configuration in target tenant should be adjusted. For example, the proposal generator 208 may create a new configuration. This may be the case where there is no corresponding configuration in the target tenant and/or a completely new configuration is created in the source tenant.

In alternate implementations, the proposal generator 208 may be configured to creating a configuration mapping. Some tenants/applications may provide a mapping concept. In this case, not all configurations need to be created locally. Instead, a configuration from the source tenant may be mapped to a configuration existing in the target tenant.

In further alternate implementations, the proposal generator 208 may be configured to update an existing configuration. By way of a non-limiting example, an order type already transferred to the target tenant is changed in the source tenant. In this case, the proposal generator 208 would propose to update the existing target tenant order type.

In some implementations, for performing proposal generation, the proposal generator 208 may use one or more of the following information/data: a configuration data from the source tenant, a change information from the source tenant (i.e., which parameters have been changed), a configuration mapping information in the target tenant, a configuration in the target tenant and/or any rules (e.g., maintained in the rules database 322). Using this information, the proposal generator 208 may be configured to support simple one-to-one transfer and allow customization of the proposal to target tenant's computing environment. Further, using rules stored in the rules database 322, various complex derivations of target tenant's configuration parameters may be handled.

In some implementations, the proposal generator 208 may provide any proposals for changes to configurations to the proposal storage 318 of the target tenant 104 for storage, which may, in turn, provide them to the configuration updated component 316 of the target tenant 104 for further implementation/processing.

In some implementations, the rules database 322 may be configured to provide flexibility to generate an optimal (e.g., "best-in class") proposal. To allow for such full flexibility, the rules database 322 may include one or more of the following: basic rules (e.g., parameter A of the source tenant is equal to parameter X in the target tenant), simple rules (e.g., parameter X in the target tenant is parameter A from source tenant with a prefix added), complex rules which may be a combination of multiple source parameters used to determine/calculate a value of one or more target tenant's parameters, coded rules which may be used to determine target tenant's parameter values requiring various logic (e.g., computing logic, business logic, etc.), thereby requiring full programming flexibility, and/or any other rules. In some implementations, one or more service providers may be a source for these rules, where the rules may include general dependencies between the customizing objects in the source and target tenants. Additionally, the rules database 322 may be supplemented by any customer specific extensions, parameters, rules, etc. By way of a non-limiting example, only the customer knows and decides whether a prefix is added to a parameter during proposal generation.

In some implementations, the configuration component 202 may operate as a dedicated service and has several integration channels to other services (e.g., source and target tenants, enterprise messaging component 204, process workflow component 214, etc.), and this, there may be a risk that a processing of a configuration change in the source system may fail, such as, due to communication errors, downtimes of the other services, etc. To address these and to ensure smooth, consistent, etc. operation of the system 200, the monitoring and error handling component 212 may be configured to perform monitoring of configuration updates in the target tenant as well as deal with any errors that may be generated as a result of the process.

The component 212 may be configured to ensure that every configuration change in the source tenant system is processed correctly. The component 212 may be configured to identify an error during configuration update process and generate an alert that may be indicative that the processing of configuration update is "erroneous". One or more user 302, 312 may be notified that this error situation has occurred, and the component 212 may be configured to trigger a re-start of the processing.

The component 212 may further identify error situations and provide corresponding statistical data which may be analyzed for process improvement. The component 212 may also provide an overview of any other statistical data, such as, a number of changes processed, processing times, proposal accuracy, etc.

The metadata management component 326 may be responsible for management of data which may be used by the change analyzer 210 and the proposal generator 208. For example, such management may include maintenance of a list of relevant objects ("white list") 320 and the rules 322. The white list 320 may include information about which object(s) from the source tenant system are relevant to which object(s) in the target tenant system(s). Maintenance/management of such lists/rules may be important because one configuration might not be relevant for all tenants in the system. In some implementations, each tenant in a system (e.g., an integrated business scenario) may act as a provider as well as consumer. The metadata management component 326 may be configured to store this information in the white list 320.

The metadata management component 326 may also supports an extension of simple rules by "coded rules" where service providers and/or users may add programs/services which may be used to analyze a change and/or create a proposal.

In some implementations, the enterprise messaging component 204 may be configured to provide notifications of configuration changes in a source system to the configuration component 202. Whenever a configuration change happens in any source tenant of the system 200, a message may be transmitted from the source tenant to the enterprise messaging component 204. As stated above, the configuration component 202 may be subscribed to these messages. Upon receiving such a change notification, the component 202 may initiate processing of this configuration change as described above.

The process workflow component 214 may serve as an intermediary for the purposes of distribution, management and monitoring of configuration changes/implementations. The component 214 may be configured to provide various notifications to tenants and/or their users concerning various aspects of implementation of configuration changes.

In some implementations, each tenant 102, 104 may be configured to have their respective local configuration tools and components 106, 108, 304-308, and 314-318. The tools may be configured to be used for a storage for the configuration proposal, provide a capability to transfer the configuration proposal to the local configuration, and provide an integration into the local business configuration lifecycle tools and methodologies. These additional tools may be provided by the tenant infrastructure in a central manor. Doing so may allow minimization of development efforts in the target tenant.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 5:
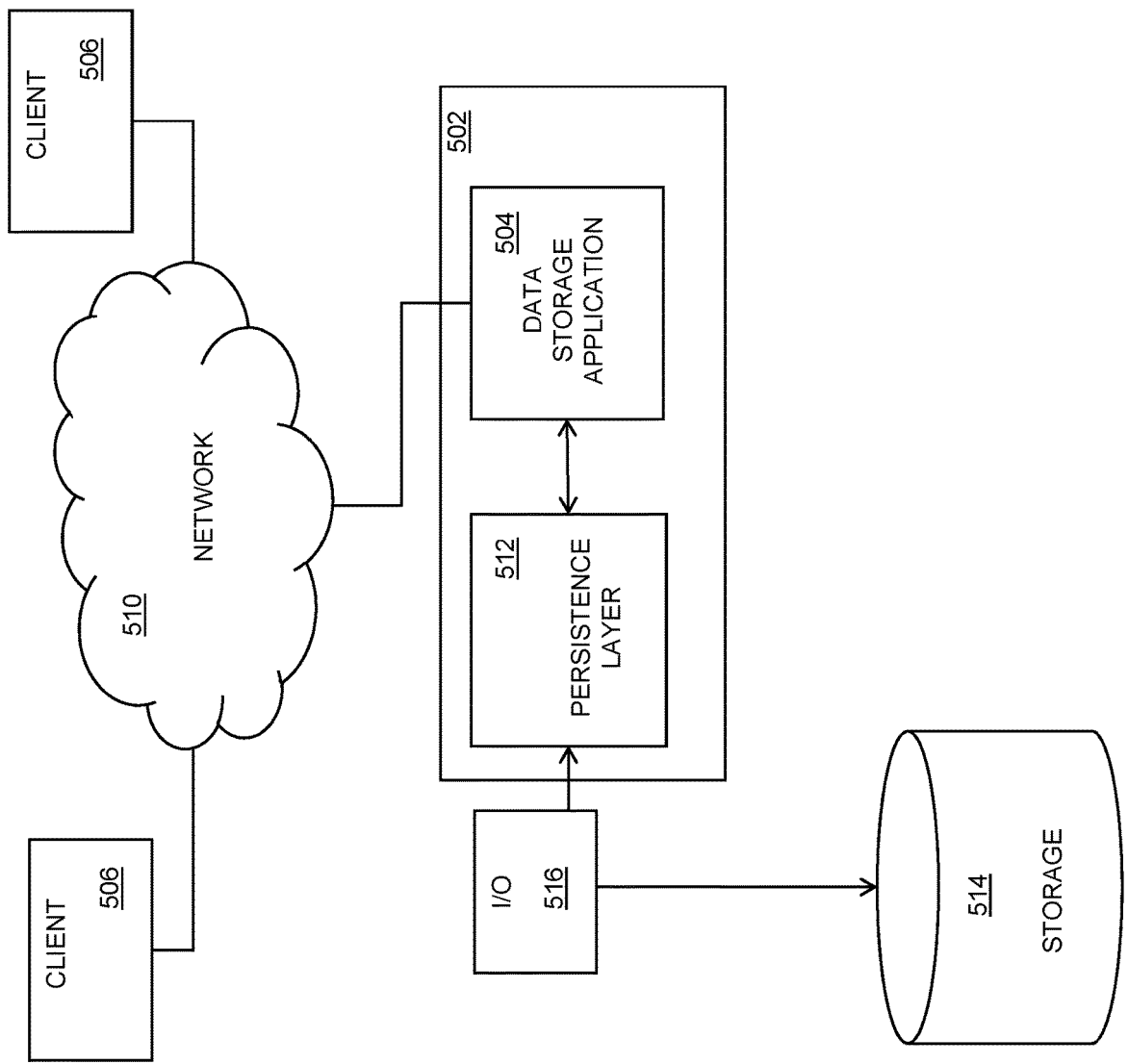
FIG. 5 is a diagram illustrating an exemplary system including a data storage application, according to some implementations of the current subject matter.

FIG. 5 illustrates an exemplary system 500 in which a computing system 502, which can include one or more programmable processors that can be collocated, linked over one or more networks, etc., executes one or more modules, software components, or the like of a data storage application 504, according to some implementations of the current subject matter. The data storage application 504 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 502 as well as to remote users accessing the computing system 502 from one or more client machines 506 over a network connection 510. One or more user interface screens produced by the one or more first modules can be displayed to a user, either via a local display or via a display associated with one of the client machines 506. Data units of the data storage application 504 can be transiently stored in a persistence layer 512 (e.g., a page buffer or other type of temporary persistency layer), which can write the data, in the form of storage pages, to one or more storages 514, for example via an input/output component 516. The one or more storages 514 can include one or more physical storage media or devices (e.g. hard disk drives, persistent flash memory, random access memory, optical media, magnetic media, and the like) configured for writing data for longer term storage. It should be noted that the storage 514 and the input/output component 516 can be included in the computing system 502 despite their being shown as external to the computing system 502 in FIG. 5.

Data retained at the longer term storage 514 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 6:
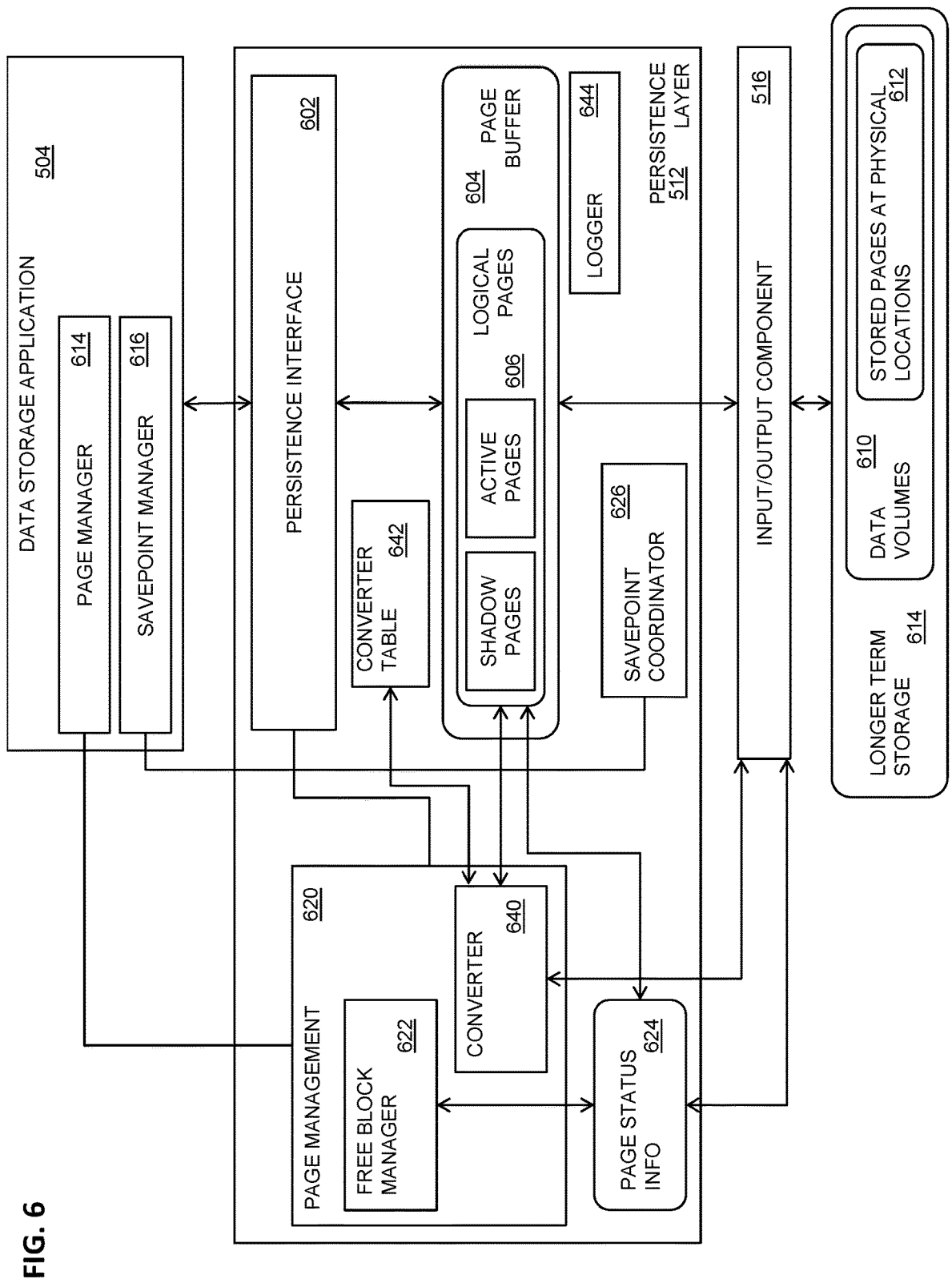
FIG. 6 is a diagram illustrating details of the system of FIG. 5.

FIG. 6 illustrates exemplary software architecture 600, according to some implementations of the current subject matter. A data storage application 504, which can be implemented in one or more of hardware and software, can include one or more of a database application, a network-attached storage system, or the like. According to at least some implementations of the current subject matter, such a data storage application 504 can include or otherwise interface with a persistence layer 512 or other type of memory buffer, for example via a persistence interface 602. A page buffer 604 within the persistence layer 512 can store one or more logical pages 606, and optionally can include shadow pages, active pages, and the like. The logical pages 606 retained in the persistence layer 512 can be written to a storage (e.g. a longer term storage, etc.) 514 via an input/output component 516, which can be a software module, a sub-system implemented in one or more of software and hardware, or the like. The storage 514 can include one or more data volumes 610 where stored pages 612 are allocated at physical memory blocks.

In some implementations, the data storage application 504 can include or be otherwise in communication with a page manager 614 and/or a savepoint manager 616. The page manager 614 can communicate with a page management module 620 at the persistence layer 512 that can include a free block manager 622 that monitors page status information 624, for example the status of physical pages within the storage 514 and logical pages in the persistence layer 512 (and optionally in the page buffer 604). The savepoint manager 616 can communicate with a savepoint coordinator 626 at the persistence layer 512 to handle savepoints, which are used to create a consistent persistent state of the database for restart after a possible crash.

In some implementations of a data storage application 504, the page management module of the persistence layer 512 can implement a shadow paging. The free block manager 622 within the page management module 620 can maintain the status of physical pages. The page buffer 604 can include a fixed page status buffer that operates as discussed herein. A converter component 640, which can be part of or in communication with the page management module 620, can be responsible for mapping between logical and physical pages written to the storage 514. The converter 640 can maintain the current mapping of logical pages to the corresponding physical pages in a converter table 642. The converter 640 can maintain a current mapping of logical pages 606 to the corresponding physical pages in one or more converter tables 642. When a logical page 606 is read from storage 514, the storage page to be loaded can be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 can ensure that changes made in the data storage application 504 are durable and that the data storage application 504 can be restored to a most recent committed state after a restart. Writing data to the storage 514 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 644 can also be included to store the changes made to the data of the data storage application in a linear log. The logger component 644 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 644 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 512 can use a combination of undo log entries (from one or more logs) and shadow paging.

The persistence interface 602 can handle read and write requests of stores (e.g., in-memory stores, etc.). The persistence interface 602 can also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 644 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 644 can write a database log (or simply referred to herein as a "log") sequentially into a memory buffer in natural order (e.g., sequential order, etc.). If several physical hard disks/storage devices are used to store log data, several log partitions can be defined. Thereafter, the logger 644 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 504 can use shadow paging so that the savepoint manager 616 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 7:
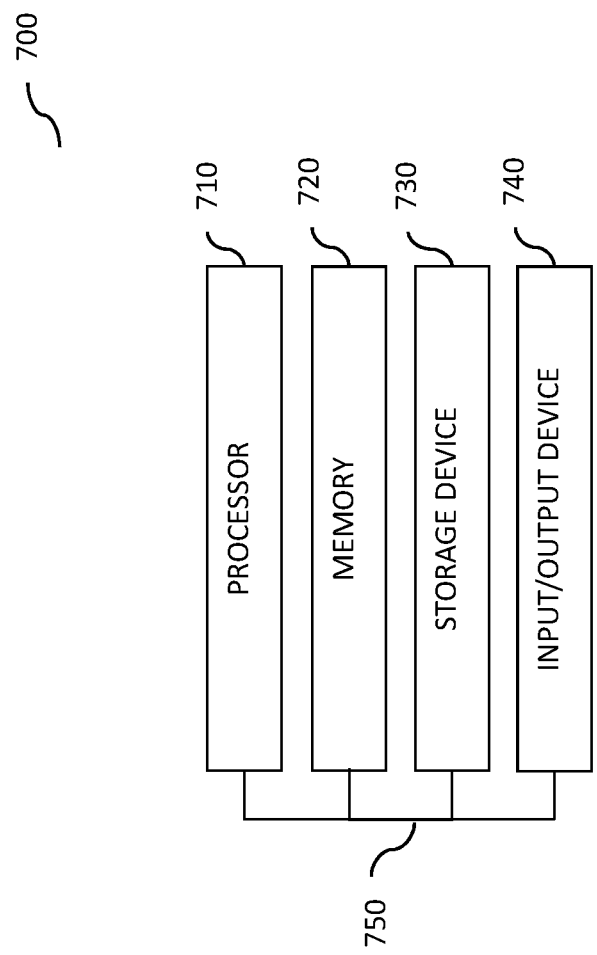
FIG. 7 is an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
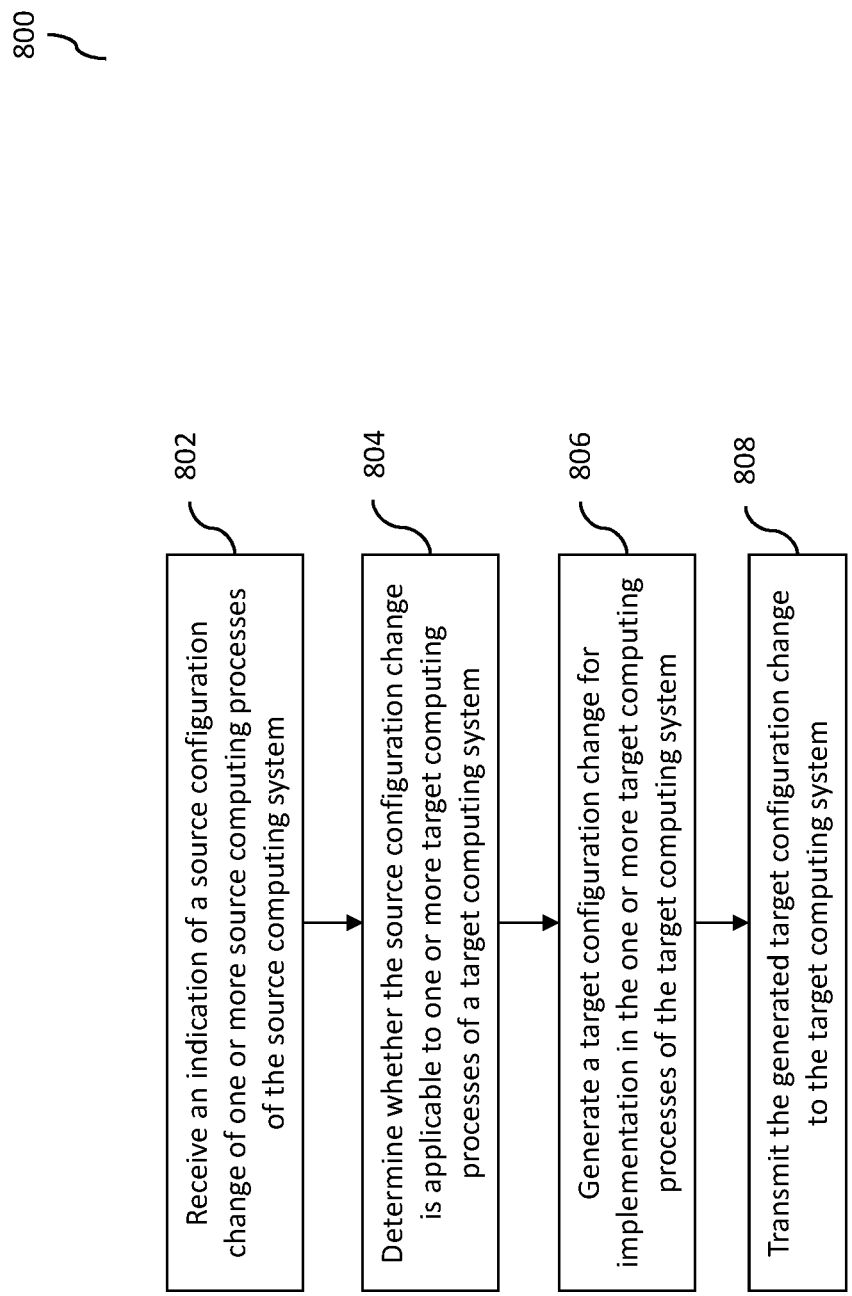
FIG. 8 is an exemplary method, according to some implementations of the current subject matter.

FIG. 8 illustrates an exemplary method 800 for performing software configuration alignment, according to some implementations of the current subject matter. At 802, an indication of a source configuration change of one or more source computing processes of the source computing system may be received from a source computing system. At 804, a determination whether the source configuration change is applicable to one or more target computing processes of a target computing system may be made. The target computing system may be communicatively coupled to the source computing system. At 806, using the source configuration change, a target configuration change for implementation in the target computing processes of the target computing system may be generated. At 808, the generated target configuration change may be transmitted to the target computing system. The generated target configuration change may then be implemented in the target computing processes of the target computing system.

In some implementations, the current subject matter can include one or more of the following optional features. In some implementations, the target computing processes may correspond to the source computing processes. Further, the target computing processes may be dependent on the source computing processes.

In some implementations, the determination of the target configuration change may include determining that the source configuration change is not applicable to the one or more target computing processes. In this case, the target configuration change is not generated upon determination that the source configuration change is not applicable to the target computing processes.

In some implementations, source configuration change may include at least one of the following: a new configuration, a mapping of configurations in the source computing system, and an update to an existing configuration.

In some implementations, the target configuration change may be generated based on at least one of the following: the source configuration change, one or more parameters corresponding to the source configuration change, a mapping data of the target computing system, one or more configurations of the one or more target computing processes, and one or more configuration rules.

In some implementations, the configuration rules may include at least one of the following: one or more basic rules identifying correspondence between one or more parameters of source and target computing processes, one or more simple rules identifying correspondence between one or more parameters of source and target computing processes using one or more prefixes, one or more complex rules identifying a plurality of parameters of the source computing processes for determination of one or more parameters of the target computing processes, and one or more coded rules for determination of coding for one or more parameters of the target computing processes.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    receiving, from a source computing system, an indication of a source configuration change of one or more source computing processes of the source computing system;
    determining whether the source configuration change is applicable to one or more target computing processes of a target computing system, the target computing system being communicatively coupled to the source computing system, wherein the determining includes determining that the source configuration change is not applicable to the one or more target computing processes, wherein the target configuration change is not generated upon determination that the source configuration change is not applicable to the one or more target computing processes;
    generating, using the source configuration change, a target configuration change for implementation in the one or more target computing processes of the target computing system; and
    transmitting the generated target configuration change to the target computing system, wherein the generated target configuration change is implemented in the one or more target computing processes of the target computing system.

2. The method according to claim 1, wherein the one or more target computing processes corresponds to the one or more source computing processes.

3. The method according to claim 2, wherein the one or more target computing processes is dependent on the one or more source computing processes.

4. The method according to claim 1, wherein source configuration change includes at least one of the following: a new configuration, a mapping of configurations in the source computing system, and an update to an existing configuration.

5. The method according to claim 1, wherein the target configuration change is generated based on at least one of the following: the source configuration change, one or more parameters corresponding to the source configuration change, a mapping data of the target computing system, one or more configurations of the one or more target computing processes, and one or more configuration rules.

6. The method according to claim 5, wherein the configuration rules include at least one of the following: one or more basic rules identifying correspondence between one or more parameters of source and target computing processes, one or more simple rules identifying correspondence between one or more parameters of source and target computing processes using one or more prefixes, one or more complex rules identifying a plurality of parameters of the one or more source computing processes for determination of one or more parameters of the one or more target computing processes, and one or more coded rules for determination of coding for one or more parameters of the one or more target computing processes.

7. A system comprising:
    at least one programmable processor; and
    a non-transitory machine-readable medium storing instructions that, when executed by the at least one programmable processor, cause the at least one programmable processor to perform operations comprising:
        receiving, from a source computing system, an indication of a source configuration change of one or more source computing processes of the source computing system;
        determining whether the source configuration change is applicable to one or more target computing processes of a target computing system, the target computing system being communicatively coupled to the source computing system, wherein the determining includes determining that the source configuration change is not applicable to the one or more target computing processes, wherein the target configuration change is not generated upon determination that the source configuration change is not applicable to the one or more target computing processes;

generating, using the source configuration change, a target configuration change for implementation in the one or more target computing processes of the target computing system; and transmitting the generated target configuration change to the target computing system, wherein the generated target configuration change is implemented in the one or more target computing processes of the target computing system.

8. The system according to claim 7, wherein the one or more target computing processes corresponds to the one or more source computing processes.

9. The system according to claim 8, wherein the one or more target computing processes is dependent on the one or more source computing processes.

10. The system according to claim 7, wherein source configuration change includes at least one of the following: a new configuration, a mapping of configurations in the source computing system, and an update to an existing configuration.

11. The system according to claim 7, wherein the target configuration change is generated based on at least one of the following: the source configuration change, one or more parameters corresponding to the source configuration change, a mapping data of the target computing system, one or more configurations of the one or more target computing processes, and one or more configuration rules.

12. The system according to claim 11, wherein the configuration rules include at least one of the following: one or more basic rules identifying correspondence between one or more parameters of source and target computing processes, one or more simple rules identifying correspondence between one or more parameters of source and target computing processes using one or more prefixes, one or more complex rules identifying a plurality of parameters of the one or more source computing processes for determination of one or more parameters of the one or more target computing processes, and one or more coded rules for determination of coding for one or more parameters of the one or more target computing processes.

13. A computer program product comprising a non-transitory machine-readable medium storing instructions that, when executed by at least one programmable processor, cause the at least one programmable processor to perform operations comprising:

receiving, from a source computing system, an indication of a source configuration change of one or more source computing processes of the source computing system;

determining whether the source configuration change is applicable to one or more target computing processes of a target computing system, the target computing system being communicatively coupled to the source computing system, wherein the determining includes determining that the source configuration change is not applicable to the one or more target computing processes, wherein the target configuration change is not generated upon determination that the source configuration change is not applicable to the one or more target computing processes;

generating, using the source configuration change, a target configuration change for implementation in the one or more target computing processes of the target computing system; and transmitting the generated target configuration change to the target computing system, wherein the generated target configuration change is implemented in the one or more target computing processes of the target computing system.

14. The computer program product according to claim 13, wherein the one or more target computing processes corresponds to the one or more source computing processes.

15. The computer program product according to claim 14, wherein the one or more target computing processes is dependent on the one or more source computing processes.

16. The computer program product according to claim 13, wherein source configuration change includes at least one of the following: a new configuration, a mapping of configurations in the source computing system, and an update to an existing configuration.

17. The computer program product according to claim 13, wherein the target configuration change is generated based on at least one of the following: the source configuration change, one or more parameters corresponding to the source configuration change, a mapping data of the target computing system, one or more configurations of the one or more target computing processes, and one or more configuration rules;

wherein the configuration rules include at least one of the following: one or more basic rules identifying correspondence between one or more parameters of source and target computing processes, one or more simple rules identifying correspondence between one or more parameters of source and target computing processes using one or more prefixes, one or more complex rules identifying a plurality of parameters of the one or more source computing processes for determination of one or more parameters of the one or more target computing processes, and one or more coded rules for determination of coding for one or more parameters of the one or more target computing processes.

\* \* \* \* \*